US005656898A

United States Patent [19]

Kalina

[11] Patent Number: 5,656,898

[45] Date of Patent: Aug. 12, 1997

[54] SLIDING DOOR APPARATUS

[76] Inventor: Edward T. Kalina, P.O. Box 440, Piedmont, S. Dak. 57769

[21] Appl. No.: 501,680

[22] Filed: Jul. 12, 1995

[51] Int. Cl.[6] .................... G05B 5/00

[52] U.S. Cl. .................... 318/282; 318/445; 49/349

[58] Field of Search .................... 318/445, 446, 318/466–470, 478, 280–282; 49/116–118, 348–352; 160/176.1, 201, 205, 214

[56] References Cited

U.S. PATENT DOCUMENTS

| | | | |
|---|---|---|---|
| 3,051,281 | 8/1962 | Huff, Jr. . | |
| 3,343,302 | 9/1967 | Browning et al. . | |
| 3,735,531 | 5/1973 | Kramer . | |
| 3,857,466 | 12/1974 | Berkovitz et al. . | |
| 3,868,000 | 2/1975 | Spear et al. . | |
| 3,893,260 | 7/1975 | Cadiou . | |
| 4,281,475 | 8/1981 | Spadoni-Censi . | |
| 4,451,202 | 5/1984 | Dockery . | |
| 4,475,312 | 10/1984 | Deutschle | 49/360 |
| 4,604,826 | 8/1986 | Sorber . | |
| 4,621,452 | 11/1986 | Deeg . | |
| 4,697,383 | 10/1987 | Hagiwara . | |
| 4,706,227 | 11/1987 | DuVall et al. . | |
| 4,866,881 | 9/1989 | Morrow et al. . | |
| 4,887,205 | 12/1989 | Chou . | |
| 4,894,952 | 1/1990 | Trett et al. . | |
| 4,914,859 | 4/1990 | Gionet et al. . | |
| 4,967,083 | 10/1990 | Kornbrekke et al. . | |
| 5,039,925 | 8/1991 | Schap . | |
| 5,105,131 | 4/1992 | Schap . | |
| 5,142,152 | 8/1992 | Boiucaner . | |
| 5,197,582 | 3/1993 | Cropley . | |
| 5,422,552 | 6/1995 | Parisi | 318/466 |

*Primary Examiner*—Brian Sircus

*Attorney, Agent, or Firm*—Lowe, Price, LeBlanc & Becker

[57] ABSTRACT

An apparatus for opening and closing a horizontally sliding door includes a chain driven assembly, a reversible motor for moving the chain and a sliding door driver which converts the chain motion to door movement. A remote control device can also be used to operate the sliding door remotely, especially if users are elderly or handicapped individuals.

8 Claims, 3 Drawing Sheets

SLIDING DOOR APPARATUS

FIELD OF THE INVENTION

The present invention is directed to a sliding door apparatus and, in particular, to a motor-driven device for opening and closing a sliding door.

BACKGROUND ART

In the prior art, various devices and apparatus have been proposed for controlling the operation of a sliding door. U.S. Pat. No. 4,541,202 to Dockery discloses a sliding door operator which comprises a tubular housing adapted to receive first and second elongated bars in a spaced apart and parallel arrangement. Both bars include a gear-toothed rack engaged by a single motor driven gear. The operator is mounted near the bottom of the door with the bars cooperating with the rack for sliding door operation.

U.S. Pat. No. 5,197,582 to Cropley discloses another type of electric door opener for sliding doors. In this patent, the electric operator comprises a motor having an iron cooling flywheel disposed on a drive shaft thereof, the flywheel being provided for imparting a predetermined amount of inertia for starting and stopping of the motor such that the operation of the motor is characterized by a soft start and stop. Means are provided for coupling rotation of the drive shaft to linear movement of the sliding door along its track.

The prior art has also proposed remote control mechanism for sliding doors. U.S. Pat. No. 3,735,531 to Kramer discloses a sliding door which is closed by a reversible power-driven slide. The sliding door is controlled by a remote control mechanism.

Although the prior art has proposed various sliding door mechanisms, many of these designs are overly complex and not conducive to use in a sliding door for home use. Many of the prior art designs are not compatible with residential door designs and cannot easily be hidden or used in conjunction with a particular room decor. In addition, since these prior art devices are not readily adaptable for residential use, there lacks an apparatus or device which can facilitate opening and closing of a sliding door which can be used by an invalid or elderly person who cannot readily get up and open or close the door for a given need such as letting a pet in or out of the house.

In view of the disadvantages of the prior art devices related to sliding doors noted above, a need has developed to provide an improved sliding door operator which is adaptable for residential door use, can be easily blended with a room's decor and can be used by an elderly person or invalid.

Responsive to this need, the present invention provides a sliding door opener which is easily masked by a valance, curtain or the like, is simplistic and efficient in its design and can be operated by remote control.

SUMMARY OF THE INVENTION

Accordingly, it is a first object of the present invention to provide a sliding door opener which facilitates operation of a sliding glass door, either via remote control or a switch.

Another object of the present invention is to provide a sliding door opener which is compact in design and can be easily hid behind a valance, drapes or a headboard.

A further object of the invention is to permit elderly or handicapped individuals to remotely operate the sliding door to facilitate entry and/or exit into a building structure such as a house.

Other objects and advantages of the present invention will become apparent as a description thereof proceeds.

In satisfaction of the forgoing objects and advantages, the present invention provides a device for opening and closing a sliding door, the device mounted within a door frame having at least one vertical frame leg and a top frame plate. The device comprises a reversible motor mounted to the door frame and connectable to a power source. A chain drive assembly is provided which includes a chain mounted on a drive sprocket and idler pulley, the drive sprocket coupled to the reversible motor. The chain drive assembly is preferably mounted adjacent the top frame plate to make it easier to shield it from view. A sliding door driver is provided, one end thereof connected to the chain with the other end connected to the sliding door. Actuation of the motor drives the chain such that the sliding door driver moves the sliding door between open and closed position.

Preferably, the chain drive assembly includes a housing which surrounds the chain, drive sprocket and idler pulley. The housing can be hinged to facilitate storage and/or transportation.

A remote control mechanism can also be provided so that the reversible motor can be actuated remotely. The idler pulley is adjustable to facilitate chain tensioning of the device.

BRIEF DESCRIPTION OF THE DRAWINGS

Reference is now made to the drawings of the invention wherein.

DESCRIPTION OF THE PREFERRED EMBODIMENTS

The present invention provides a device for opening and closing a horizontally sliding door which is an improvement over those known in the prior art through its compact and efficient design.

Figure 1:
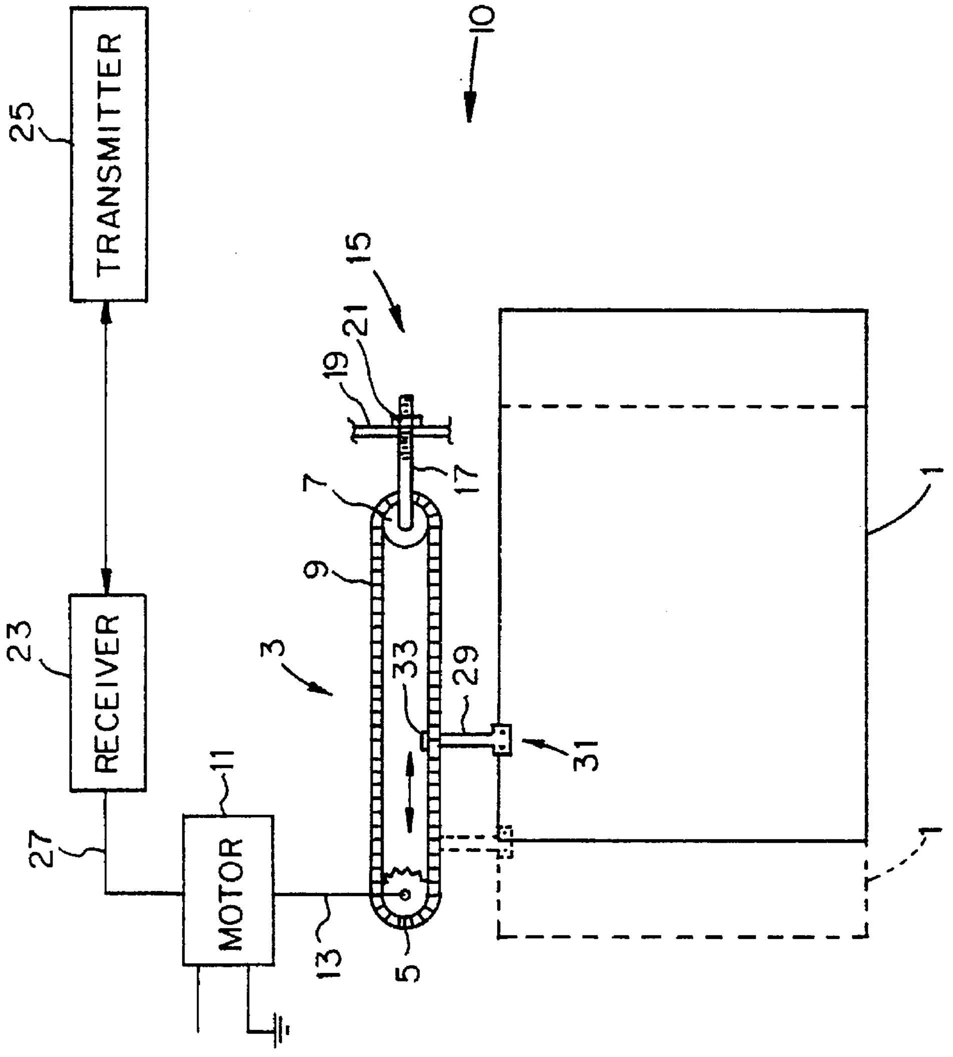
FIG. 1 is a schematic representation of the inventive device for opening and closing a sliding door.

With reference to FIG. 1, a schematic of the apparatus for opening and closing a sliding door according to the invention is generally designated by the reference numeral 10. The sliding door is represented by the reference numeral 1.

As part of the inventive apparatus, a chain drive assembly 3 is provided for horizontally sliding the door 1 between open and closed positions. The door 1 is depicted in the open position, the closed position represented by the cross hatched door 1.

The chain drive assembly 3 includes a drive sprocket 5, and idler pulley 7 and a chain 9. The drive sprocket 5 and idler pulley 7 can be mounted to any type of housing which will maintain them in a spaced part relationship while providing both rotation of the sprocket 5 and idler pulley 7 and movement of the chain 9.

The drive sprocket 5 is driven by a reversible motor 11, the reversible motor 11 connected to the drive sprocket 5 by a coupling represented by the reference numeral 13. The coupling can be any known type which will rotate the drive sprocket 5 based upon the motor 11 output at a desired rotational speed.

The idler pulley 7 is provided with a tensioning assembly 15 which permits chain tensioning for apparatus operation. The tensioning assembly 15 is schematically represented by a member 17 which is fixed at one end to the idler pulley 7 in any known manner. The other end of the member 17 extends through a base 19 and has a nut 21 on its threaded end. Rotation of the nut 21 can longitudinally translate the member 17 and idler pulley 7 to tension the chain 9. Of course, other tensioning assemblies may be utilized as are known in the art for chain tensioning.

In a preferred mode of the invention, a receiver 23 and transmitter 25 are provided. The receiver 23 is connected to the motor via line 27 for remote actuation thereof. The transmitter can be operated by an apparatus user remote from the receiver to actuate the motor 11. With the transmitter 25, a person can open or close the sliding door 1 as need be.

The chain 9 is coupled to the door 1 by a sliding door driver 29. The driver 29 is attached to the door at one end, this attachment designated by the reference numeral 31. The other end of the driver is secured to the chain 33 for attachment thereto. Typically, the drive 29 has a flange on one end to be fastened to the door surface. The other end can employ a clamp which would attach to the chain links. Alternatively, the driver end could extend through a chain link opening and be attached thereto with the appropriate fasteners.

In operation, when the reversible motor 11 is actuated either by a hard-wired switch (not shown) or the receiver 23/transmitter 25 combination, the chain will travel, the chain movement also moving the driver 29 to horizontally slide the door between open and closed positions. It should be understood that the sliding door driver can be any configuration or type provided that the chain 9 is linked to the door 1 such that the chain movement translates into sliding door movement.

Figure 2:
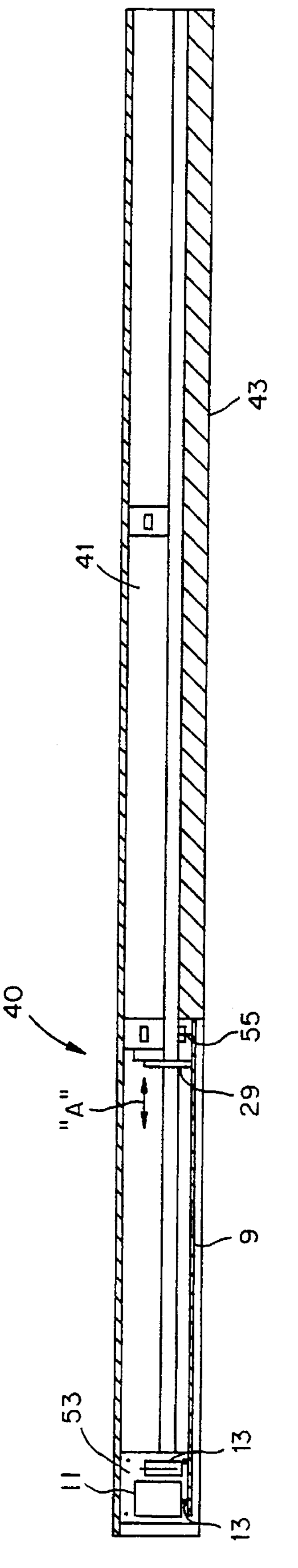
FIG. 2 is the top view of a preferred embodiment of the invention when installed.
Figure 3:
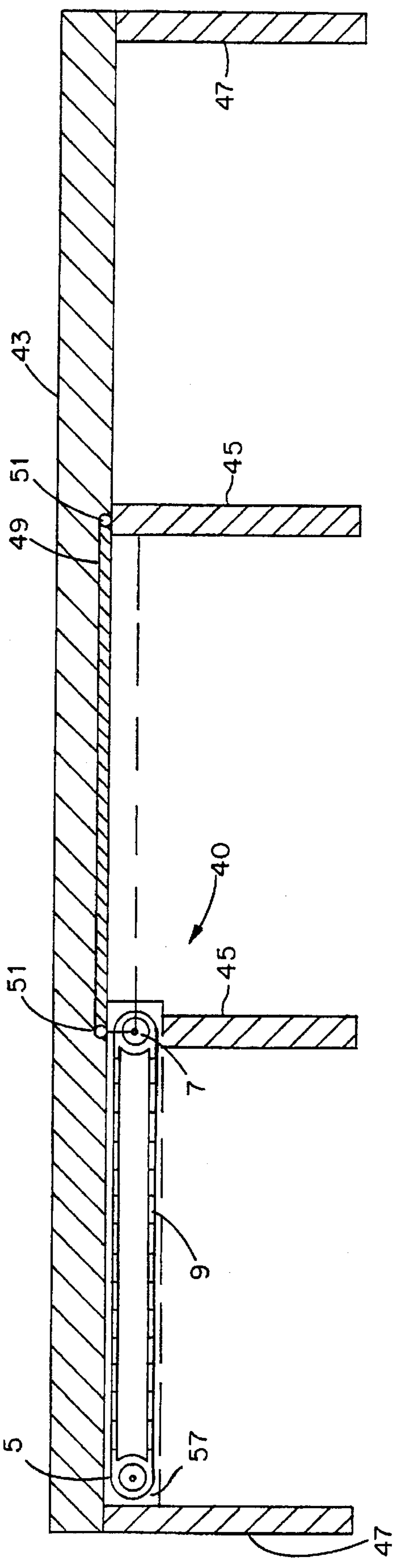
FIG. 3 is a front elevational view of the embodiment depicted in FIG. 2.

Referring now to FIGS. 2 and 3, a preferred embodiment of the apparatus for opening and closing a sliding door is generally designated by the reference numeral 40. In this embodiment, a sliding door 41 is shown positioned beneath the top frame plate 43 of a door frame positioned behind legs 45 and between vertical jam legs 47. The door 41 slides in a track 49 on guide rollers 51.

The inventive apparatus 40 is depicted with the motor 11 and receiver 13 mounted on a base 53. The base 53 is preferably cup-shaped to retain the motor 11 and receiver 13 therein, the base 53 mountable to one or both of the jam leg 47 or frame plate 43.

The chain 9 is shown attached to the door via driver 29. The idler pulley 7 is shown attached to the leg 45 at reference numeral 55. The drive sprocket 5 is coupled to the motor as represented by reference numeral 13. The housing is schematically represented by reference numeral 57, portions not shown for clarity purposes.

In operation, the chain 9 travels back and forth such that the driver 29 can move as indicated by the arrow A. Movement of the top leg of the chain 9 with the driver towards the motor pulls the sliding glass door via the driver 29 so as to open the sliding door. Reverse motor operation pushes the door 41 back into its closed position.

Figure 5:
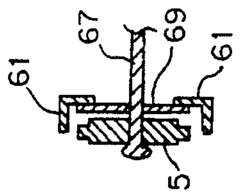
FIG. 5 is a cross-sectional view along the line V—V of FIG. 4.
Figure 4:
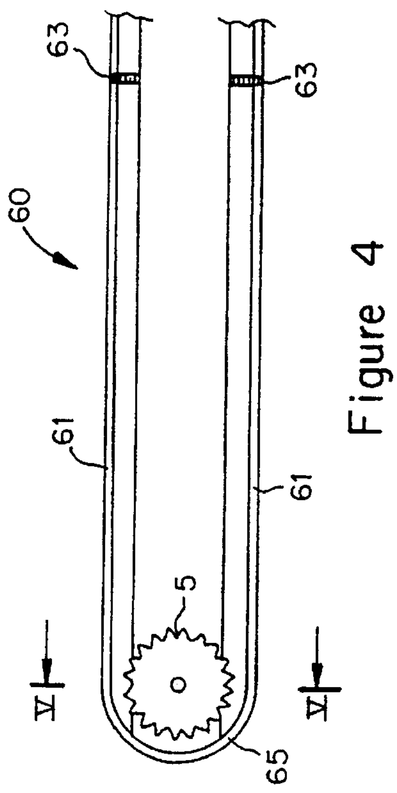
FIG. 4 is a side view of the hinged housing depicting the drive sprocket.

With reference now to FIGS. 4 and 5, an exemplary chain drive assembly housing is generally designated by the reference numeral 60. The housing 60 includes two L-shaped portions or angles 61 which terminate at one end at hinges 63 and the other end in a curved end portion 65. The hinges 63 facilitate folding of the housing in half to ease shipping, handling and transportation.

The drive sprocket 5 is fixedly mounted to the shaft 67 which is coupled (not shown) to the motor 13. The shaft 67 is supported by support plate 69 which is integrally attached to the angles 61 for shaft support. Of course, other arrangements could be utilized provided that the drive sprocket 5 is coupled to the reversible motor 11.

Figure 7:
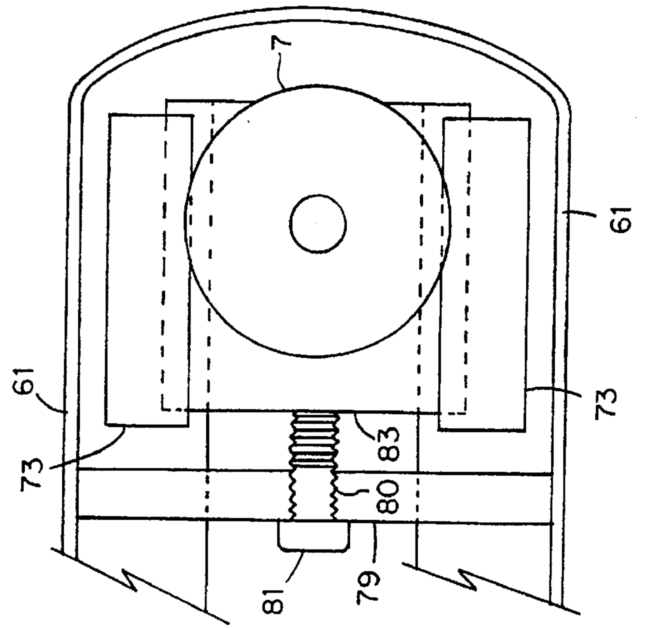
FIG. 7 is a side elevational view of the idler pulley.
Figure 6:
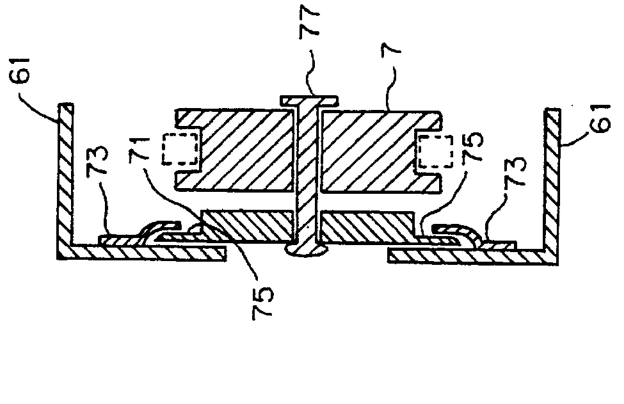
FIG. 6 is a cross-sectional view of the idler pulley of the chain drive assembly.

Referring now to FIGS. 6 and 7, the idler pulley and the tensioning assembly 15 is shown in greater detail. The tensioning assembly 15 includes a movable plate 71 which is positioned between holders 73, each holder 73 mounted to a respective angle 61. The plate 71 has opposing lip portions 75 which engage the holder 73.

The idler pulley 7 rotates on pin 77 which is fixed to the plate 71 in an conventional fashion.

A brace 79 extending between the angles 61 is affixed thereto. The brace 79 has a threaded opening 80 therethrough which receives a complimentary threaded bolt 81. The bolt 81 is sized to engage the face 83 of the plate 71 for longitudinal movement thereof. Rotation of the bolt 81 will longitudinally translate the plate 71 to tension the chain around the idler pulley 7. Reverse rotation of the bolt 81 will alloy the plate 71 to travel towards the brace 79 to relieve chain tensioning. It should be understood that this is an exemplary chain tensioning embodiment and other configurations can be utilized without departing from the scope of the invention.

As part of a preferred embodiment of the invention, the reversible motor is preferably about 2½ inches in diameter and 3¼ inches in length. The motor should operate off of 110 volts, have an rpm of 1800 with a 5⁄16 inch diameter shaft size and 1⅛ inches in length.

The mounting plate for supporting the motor and receiver, if used, should be about 4⅛ inches by 5 inches in length and width. The chain should be a number 42 type with the drive sprocket and idler pulley having two or three inch diameters.

The receiver is preferably a three stage receiver having a forward, reverse and stop function. The remote transmitter is preferably hand held.

In a preferred embodiment, the motor coupling reduces the motor revolutions per minute from 1800 to 36 for sliding door movement.

Alternatively, the motor could operate using 12 volts when supplied with a transformer. In this embodiment, the motor could be 1⁄10 horsepower operating at 20 rpm. Thus, the motor can be directly coupled to the drive sprocket to drive the chain.

Alternatively, the motor can function using a switch which is hard wired thereto. By switch operation, the door can be closed and/or open.

The sliding door opener can be used in any horizontally sliding door providing a frame for apparatus mounting. The disclosed embodiments are exemplary of different mounting arrangements and the invention is not intended to be limited by these embodiments.

As such, an invention has been disclosed in terms of preferred embodiments thereof which fulfill each and everyone of the objects of the present invention as set forth herein above and provides a new and improved sliding door opener.

Of course, various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. An apparatus for opening and closing a sliding door mounted within a door frame having at least one vertical frame leg and a top frame plate comprising:

a) a reversible motor mounted to said door frame and connectable to a power source;

b) a chain drive assembly including a chain mounted on a drive sprocket and an idler pulley, said drive sprocket coupled to said reversible motor, said chain drive assembly mounted adjacent said top frame plate, wherein said chain drive assembly includes a housing surrounding said chain, said drive sprocket and said idler pulley, said housing comprising first and second portions connected by a hinge so that said housing is foldable;

c) a sliding door driver, one end connected to said chain with another end connected to said sliding door, wherein actuation of said motor drives said chain such that said sliding door driver moves said door.

2. The apparatus of claim 1 further comprising a remote control mechanism so that said motor can be actuated remotely.

3. The apparatus of claim 1 wherein said idler pulley is adjustably spaced from said drive pulley to facilitate chain tensioning.

4. The apparatus of claim 1 wherein said housing is mounted to said top frame plate.

5. The apparatus of claim 1 wherein said top frame plate has a defined width and said chain drive assembly has a width less than the width of said top frame plate so that said chain drive assembly can be masked by a decorative covering overhanging said top frame plate.

6. The apparatus of claim 1 wherein said idler pulley is adjustably spaced from said drive pulley to facilitate chain tensioning.

7. The apparatus of claim 6 wherein said idler pulley is mounted on a plate, said plate being adjustably mounted to said housing, and a tensioning bolt is mounted to said housing, said tensioning bolt engaging said plate to translate said idler pulley for chain tensioning.

8. The apparatus of claim 1 wherein each of said first and second portions further comprises a pair of L-shaded brackets, one end of each L-shaped bracket connected to said hinge and opposite ends of the L-shaped brackets forming the first and second portions, respectively, being connected together.

* * * * *